United States Patent [19]

Giler et al.

[11] Patent Number: 5,488,651

[45] Date of Patent: * Jan. 30, 1996

[54] FAX MESSAGE SYSTEM

[75] Inventors: Eric R. Giler, Wellesley Hills; David W. Duehren, Needham, both of Mass.

[73] Assignee: Brooktrout Technology, Inc., Needham, Mass.

[*] Notice: The portion of the term of this patent subsequent to Mar. 1, 2011, has been disclaimed.

[21] Appl. No.: 203,658

[22] Filed: Feb. 28, 1994

Related U.S. Application Data

[63] Continuation-in-part of Ser. No. 721,915, Jun. 20, 1991, Pat. No. 5,291,546, which is a continuation of Ser. No. 348,592, May 8, 1989, abandoned.

[51] Int. Cl.$^6$ ............................................ H04M 11/00
[52] U.S. Cl. ........................... 379/100; 379/98; 379/97; 379/93; 358/402; 358/403; 358/407
[58] Field of Search ............................. 379/100, 98, 97, 379/93, 96, 94, 233, 214, 210, 102, 104, 105; 358/402, 403, 407

[56] References Cited

U.S. PATENT DOCUMENTS

| | | | |
|---|---|---|---|
| 4,371,752 | 2/1983 | Matthews et al. | 179/7.1 |
| 4,584,434 | 4/1986 | Hashimoto | 179/2 |
| 4,629,831 | 12/1986 | Curtin et al. | 379/213 |
| 4,635,253 | 1/1987 | Urui et al. | 370/67 |
| 4,652,700 | 3/1987 | Matthews et al. | 379/89 |
| 4,654,718 | 3/1987 | Sueyoshi | 358/257 |
| 4,755,985 | 7/1988 | Jayapalan et al. | 370/58 |
| 4,763,191 | 8/1988 | Gordon et al. | 358/86 |
| 4,792,967 | 12/1988 | Ladd et al. | 379/67 |
| 4,797,913 | 1/1989 | Kaplan et al. | 379/91 |
| 4,811,381 | 3/1989 | Woo et al. | 379/67 |
| 4,837,798 | 6/1989 | Cohen et al. | 379/88 |
| 4,866,758 | 9/1989 | Heinzelmann | 379/94 |
| 4,914,690 | 4/1990 | Hagedorn | 379/233 |
| 4,918,722 | 4/1990 | Duehren et al. | 379/100 |
| 4,930,153 | 5/1990 | Hagedorn | 379/233 |
| 4,935,955 | 6/1990 | Neudorfer | 379/100 |
| 4,969,184 | 11/1990 | Gordon et al. | 379/100 |
| 4,975,941 | 12/1990 | Morganstein et al. | 379/88 |
| 4,994,926 | 2/1994 | Gordon et al. | 358/400 |
| 5,115,326 | 5/1992 | Burgess et al. | 358/440 |

OTHER PUBLICATIONS

Coover, Edwin R., "Tutorial: Digital Private Branch Exchanges (PBXs)," IEEE Computer Society, 1989, pp. 152–212.

Hubbard, B., "A switch in time saves sixteen" (SX2000 PABX), Abstract, Sep. 1984, 1 page.

Enomoto, Asamu et al., "Digital EPBX For Future Office Communication," ISS '84 Florence, 7–11 May 1984, Session 43 C Paper 2 pp. 1–7.

Enomoto, Osamu et al., "Distributed Microprocessors Control Architecture for Versatile Business Communications," IEEE Journal on Selected Areas in Communications, vol. SAC-3, No. 4, Jul. 1985, pp. 508–521.

Matsushita, Keiji et al., "2400 IMS CCITT No. 7 Common Channel Interoffice Signaling System Feature Transparency Network," NEC Res. & Develop., No. 80, Jan. 1986, pp. 62–69.

(List continued on next page.)

Primary Examiner—Curtis Kuntz
Assistant Examiner—Stella L. Woo
Attorney, Agent, or Firm—Hamilton, Brook, Smith & Reynolds

[57] ABSTRACT

At least a fax message is sent via a telephone system to a telephone receiving station. From that receiving station, the fax message is routed through a multinode computer network to a prespecified network location. A telephone call by which the fax message is transmitted is initiated by dialing a telephone number such as a DID number. Part of the telephone address signal is received at the receiving station and used to establish a connection to a network location such that a fax message may be sent to or from the network location. The network location may be a mailbox associated with an intended recipient. The DID receiver may initiate a call to a second receiver using a ringing signal with routing information communicated through a separate data link.

6 Claims, 5 Drawing Sheets

OTHER PUBLICATIONS

Nozaki, Tadao et al., "APEX/NEAX2400 IMS: Application to the NEC America OA Systems,", NEC Res. & Develop. No. 81, Apr. 1986, pp. 68–76.

Matsushita, Keiji et al., "NEAX2400 IMS Personal Computer Data Interface Board," NEC Res. & Develop. No. 82, Jul. 1986, pp. 78–82.

Matsushita, Keiji et al, "NEAX2400 UMG Super-Large Capacity System," NEC Res. & Develop. No. 82, Jul. 1986, pp. 68–77.

Enomoto, O. et al., Abstracts, INSPEC References on NEAX 2400, pp. 1–5.

Nishio, Motojiro et al., "Distributed Processing Architecture for APEX/NEAX2400 VMM (Voice Mail Module)," NEC Res. & Develop., No. 84, Jan. 1987, pp. 39–45.

Kamae, T., "Development Of A Public Facsimile Communication System Using Storage and Conversion Techniques," IEEE, 1980, pp. 19.4.1–19.4.5.

Kurihara, Sadami et al., "Enhanced Facsimile Intelligent Communication System" (FICS–21), Review of the Electrical Communications Laboratories, vol. 34, No. 2, 1986, pp. 199–206.

Roca, Richard T., "ISDN Architecture," AT&T Technical Journal, Jan./Feb. 1986, vol. 65, Issue 1, pp. 5–17.

DuCastel, F. et al., "Terminals For The ISDN Era: from Speech to Image," IEEE Communications Magazine, vol. 25, No. 3, Mar. 1987, pp. 39–43.

"Integrated Services Digital Network (ISDN)," CCITT Red Book, vol. 111, Fascicle 111.5, VIIIth Plenary Assembly, Malaga–Torremolinos, 8–19 Oct. 1994, pp. 32, 34, 105–106, 133, 258, 275, 288–289, 306, 310, 336.

Bocker, Peter et al., *ISDN The Integrated Services Digital Network Concepts, Methods, Systems,* 1988, pp. 80–92 & 125–133.

Saltzberg, Burton et al., *ISDN Systems, Architecture, Technology, and Applications,* 1990, pp. 134–142.

Griffiths, John M., "ISDN Network Terminating Equipment," IEEE Transactions on Communications, vol. Com.–30, No. 9, Sep. 1982, pp. 2137–2142.

Bell Communication Research, Inc., "Simplified Message Desk Data Link Interface and Protocol Specification," Issue C, Jun. 8, 1984, 8 pages.

Notes on the BOC Data Networks, 1983, pp. 7–20.

PC Week/Hardware, "FAX servers are wonderful–but within limits; The Hard Edge; column," Mar. 27, 1989, pp. 1–3.

Pacific Image Communications Brochure, "Introducing PIC Superfax," 3 pages.

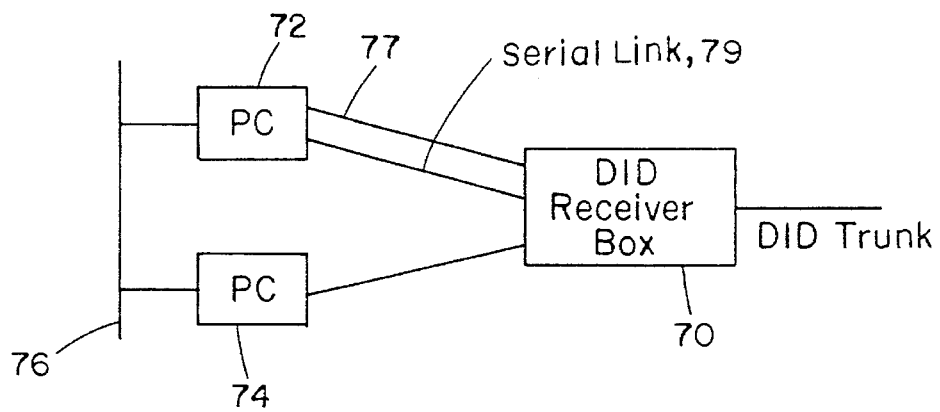
FIG. 6
| FAX Address | Mailbox |
|---|---|
| A | JONES |
| B | SMITH |
| C | JOHNSON |
FIG. 7
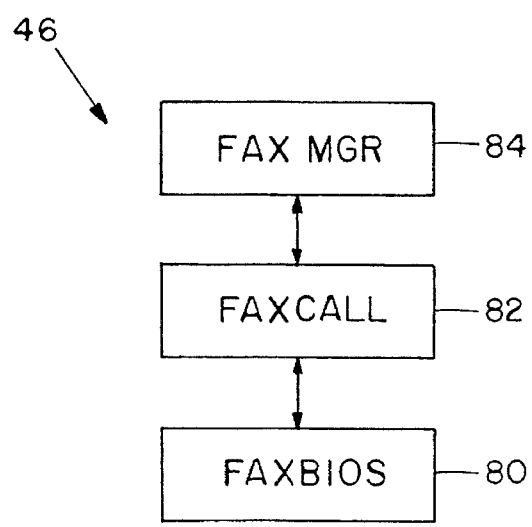
FIG. 8

5,488,651

FAX MESSAGE SYSTEM

RELATED APPLICATIONS

This is a Continuation-in Part of application Ser. No. 07/721,915 filed Jun. 20, 1991, now U.S. Pat. No. 5,291,546, Filewrapper Continuation of Ser. No. 07/348,592 filed May 8, 1989, now abandoned.

BACKGROUND OF THE INVENTION

This invention relates to facsimile (FAX) communication.

Typically, in FAX communication, a FAX machine is connected directly via a telephone company line to the telephone company central office for access to the public switched telephone network. When a remote telephone subscriber wants to send a facsimile to a local FAX machine, he gets access to the local FAX machine by dialing its telephone number. When the FAX machine answers, the remote telephone subscriber sends his FAX message.

When the sending party wants to identify the person who is to receive the FAX message, he typically writes that information on a cover sheet; someone at the local FAX machine then delivers the FAX message to the intended recipient based on the information on the cover sheet. In some FAX systems, the intended recipients can be indicated electronically by information which is exchanged after the call has been established. Typically, the information is communicated in accordance with a proprietary protocol restricted to machines of a given manufacturer.

One such scheme uses binary information that is passed (using Non-standard Facilities) as part of the FAX machine handshake. For example, the CCITT standard T.30 permits the use of Non-standard Facilities for providing such information. Such Non-standard Facilities have been used, for example, to set up mailbox facilities for FAX messages with the calling machine identifying the mailbox at the called machine to which the FAX message is to be delivered.

In a second arrangement, a FAX machine would use DTMF tones, sent by the originating FAX machine after the call has been established, to identify the intended recipient.

A third proposed technique would rely on special visible markings, on the first or each page of the FAX message, that would be recognized by the receiving FAX machine.

SUMMARY OF THE INVENTION

In general, in one aspect, the invention features a method for causing information including at least a FAX message sent via a telephone system to be subjected to prespecified actions at a receiving station. In this feature, a telephone call is initiated via the telephone system to the receiving station by dialing a telephone number enabling the telephone call to be routed to the receiving station, the telephone number also indicating the prespecified action to which a message is to be subjected at the receiving end. The telephone number is passed through the telephone system in the form of a telephone address signal as part of the call initiation process, and the telephone call is thus directed to the FAX receiving station based on the telephone address signal. At the FAX receiving station, the telephone call is answered and the telephone address signal is received. When the call has been established, the FAX message is sent via the telephone system to and received at the FAX receiving station. Stored action information associates each possible telephone address signal with a prespecified action to be taken with respect to each received FAX message corresponding to the telephone address signal. The received FAX message is handled in accordance with the prespecified action.

Preferred embodiments of the invention include the following features. The prespecified action may be to route the FAX message to an intended recipient, or to another location in a network of computers to which the FAX receiving station is connected, or to a mailbox associated with an intended recipient. The telephone address signal is a direct inward dialing (DID) telephone address signal. The intended recipient is one or more of a FAX device, a voice telephone set, a modem, or an answering machine, and the information is one or more of a FAX message, a voice, or modulated data.

In general, in another aspect, the invention features a FAX receiving station which includes (i) a FAX message receiver which answers the telephone call, receives the telephone address signal, and, when the call has been established, receives the FAX message via the telephone system, and (ii) storage for storing the action information. The FAX receiving station is arranged to handle the received FAX message in accordance with the prespecified action based on the telephone address signal.

Preferred embodiments include the following features. The receiver has a telephone port for connection to a DID trunk line. The receiver comprises a circuit board for insertion in a backplane of a personal computer. A network of communicating digital devices may be connected to the receiving station.

In general, in another aspect, the invention features a method for causing different messages each of which is expressed in one of possibly any two of the following modes—voice, FAX, and modulated data—and each of which is sent via a telephone system, to be handled in accordance with the proper mode at a receiving station; the telephone address signal is indicative of the mode, and mode information is stored which associates with each possible telephone address signal, a prespecified mode with respect to each received message corresponding to the telephone address signal. When the call has been established, the message is sent via the telephone system to the receiving station, and handled at the receiving station in accordance with the prespecified mode.

Other advantages and features will become apparent from the following description of the preferred embodiments, and from the claims.

DESCRIPTION OF THE PREFERRED EMBODIMENTS

We first briefly describe the drawings.

FIG. 6 is a block diagram of a second embodiment.

FIG. 7 is another table of actions to be taken.

FIG. 8 is a diagram of the possible organization of portions of the software.

STRUCTURE AND OPERATION

Figure 1:
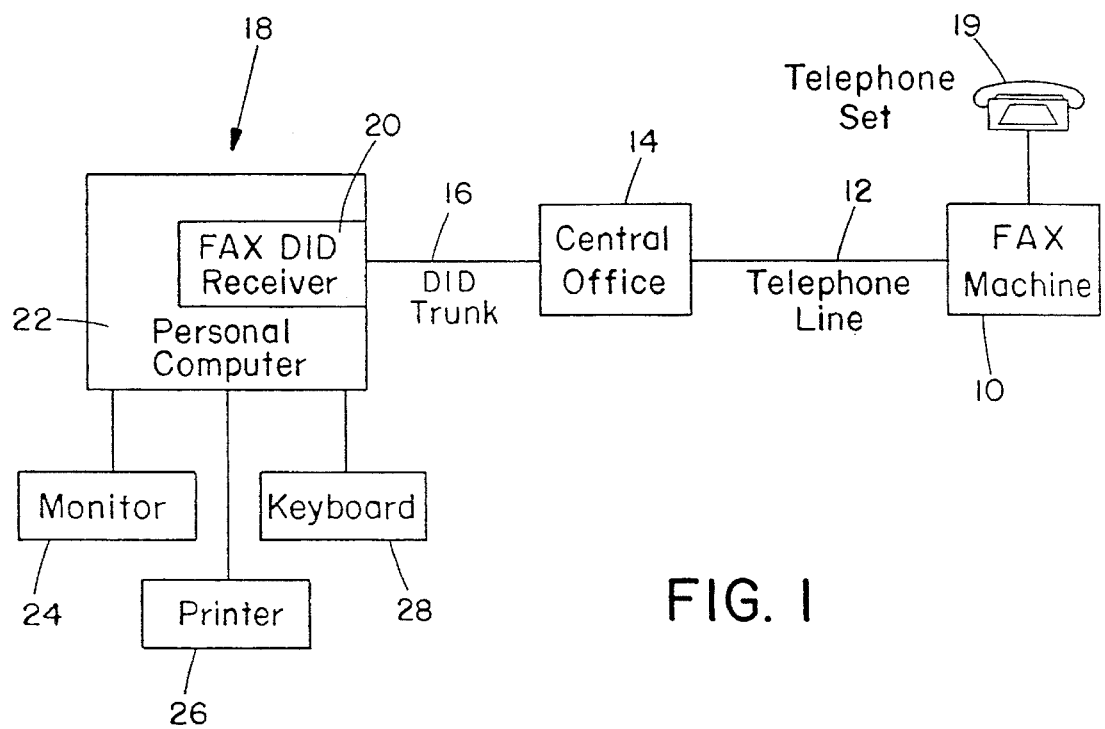
FIG. 1 is a block diagram of a FAX communication system.

Referring to FIG. 1, in a FAX communication system, a conventional FAX machine 10 is connected via a standard telephone line 12 to the telephone company central office 14. The central office 14 is in turn connected via a direct inward dialing (DID) trunk 16 to a FAX receiving station 18.

For purposes of dialing the telephone number of the FAX receiving station 18, the originating FAX machine 10 may use a telephone set 19 (or the FAX machine may have internal telephone dialing capabilities).

The DID trunk is provided as a service by the telephone company to enable, for example, direct dialing access from the public switched telephone system to specific individual telephone stations served by a private branch exchange (PBX) without requiring intervention by the operator of the PBX. In that case, the PBX serves as a satellite of the central telephone system, making the final connection to the telephone being called, but without passing the address signals to the called telephone.

In another use of DID trunk lines, direct dialing access is provided from public telephone stations to CENTREX central office stations. In either case, the DID trunk leading to the PBX or the trunk leading to the CENTREX central office station carries an address signal which indicates the telephone number of the station being called. An address signal may, for example, be the last several digits of the dialed telephone number. The PBX or the CENTREX station (called the terminal) then routes the call to the proper station based on the address signal. Typically several addresses (telephone numbers) are served by a single DID trunk line. Only one call can be active on a DID trunk at any time, but often several DID trunks are connected in parallel to the terminal to minimize blocking of calls. (Additional information concerning DID service is set forth in *Notes on the BOC Lata Networks*, 1983, published by AT&T.)

This arrangement differs from conventional telephone call switching in which the central office simply connects the originator's line to the called station's line through a switching network but does not pass any address signals along the called station's line.

The DID address signals are one type of telephone address signals which are carried on the line at the time the call is initiated and before the call is completed and are typically used by the public telephone system for routing the call. In this sense they differ from the kind of address information that may be entered by a calling party via the touch-tone keypad after a call has been established. Such touch-tone address information has been used for example to specify the recipient of a voice message in a voice messaging system or to specify the recipient of FAX messages as disclosed in copending U.S. patent application Ser. No. 192,839, filed May 11, 1988.

In FIG. 1, the DID trunk line is connected directly to a FAX DID receiver board 20 held in the backplane of a conventional personal computer 22, so that the address signals are received directly by the receiver board 20. The personal computer may have optional peripherals including a monitor 24, a printer 26, and a keyboard 28.

Figure 2:
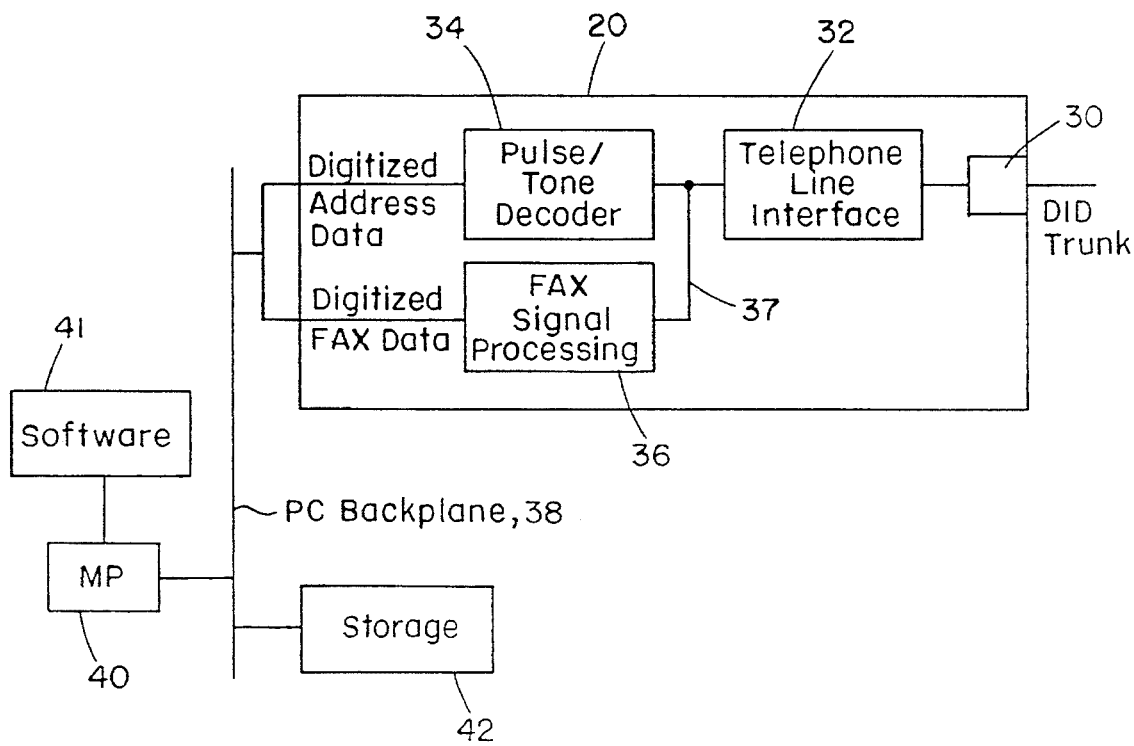
FIG. 2 is a block diagram of portions of a personal computer and the FAX DID receiver shown in FIG. 1.

Referring to FIG. 2, receiver board 20 includes a conventional telephone jack 30 to receive the DID trunk. The jack is connected to a standard telephone line interface 32 whose output is fed both to a pulse/tone decoder 34 and a FAX signal processor 36. The output of the decoder 34 is a FAX address corresponding to the digits of the DID address signal received from the DID trunk.

The FAX signal processor 36 includes a modem and other circuitry for converting the analog FAX signals on line 37 to digitized FAX data constituting a FAX message. The FAX address and the FAX message are delivered to the PC backplane 38.

A microprocessor 40, under control of software 41, examines the FAX address of each FAX message and routes the FAX message in accordance with the FAX address. Initially, and in some cases only temporarily, the FAX message may be stored in storage 42 for later use.

Figure 3:
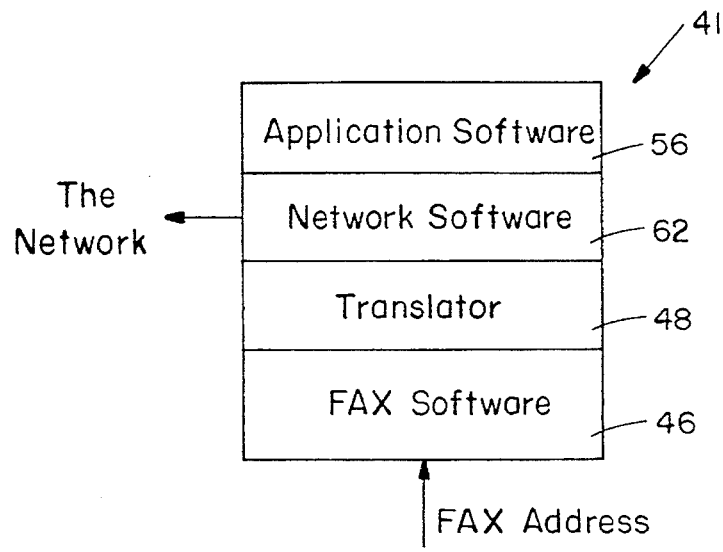
FIG. 3 is a diagram of software layers for controlling the system.

Referring to FIG. 3, software 41 includes FAX software 46 which receives the FAX address and, among other things, can pass the FAX address to a translator 48. The FAX software may also manage one or more FAX boards (including a mix of FAX DID receivers and conventional FAX receiver boards). In the case of FAX DID receivers, the software manages the incoming calls and storage of the FAX messages.

Figure 4:
FIG. 4 is a table of actions to be taken.

Referring to FIG. 4, the translator uses a table 50 to determine what action to take with respect to the FAX message associated with each received FAX address. Table 50 associates each valid FAX address 52 with an entry 54 that indicates an action to be taken with respect to the FAX message associated with the FAX address. Thus the table provides, in effect, a logical FAX address space in which the valid FAX addresses represent logical destinations of FAX messages, while the entries 54 represent virtual FAX device destinations. The table allows for the identification of FAX devices which are not necessarily real FAX machines but may be virtual machines. For example, a FAX device may actually be implemented as a personal computer having a disk drive that stores the FAX message and a CRT that displays the FAX message to the user upon request. The table also allows simply for an action to be taken with respect to a FAX message without specifying a particular FAX device at all.

An almost limitless variety of virtual FAX devices and actions can be included as entries 54 of the table.

For example, the virtual FAX device associated with a given FAX address may be the same personal computer 18 which is connected to the DID trunk. In that case, the translator may alert application software 56 located in that personal computer that a FAX message has been received. The application software could then perform any of a variety of actions. For example, it could alert the user of that personal computer that a message has been received, and when the user asks to see the message, it could fetch it from storage 42 and display it. Or the application software could be arranged to immediately print on the printer any received FAX message directed to that personal computer.

Figure 5:
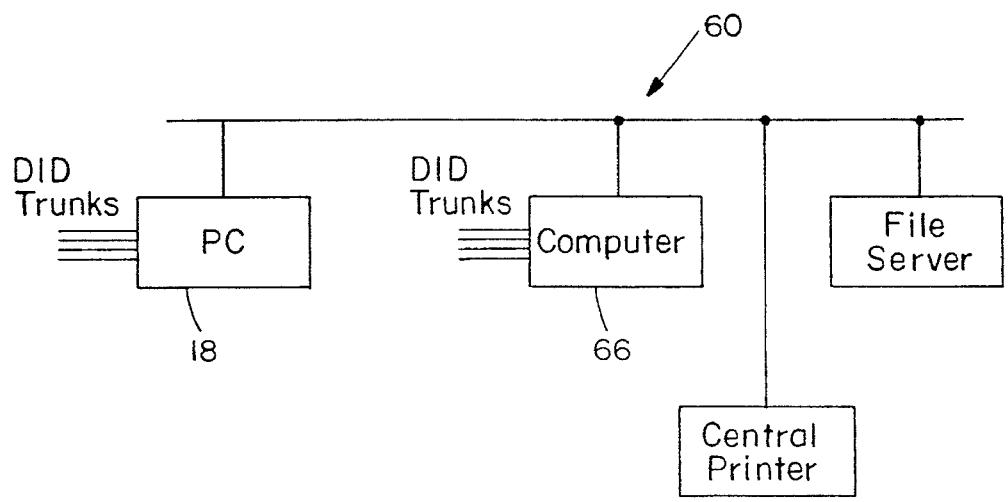
FIG. 5 is a block diagram of a network.

Referring to FIG. 5, in another example, personal computer 18 could be connected to a local area or wide area network 60 having other PCs, file servers, printers, and any other desired combination of computers and peripheral devices. The FAX address could then indicate the address of a device on the network and the translator could pass the entry 54 to network software 62 (FIG. 3) which would then fetch the message from storage 42 and route it via the network to its intended destination. Network software 62 would in part be commercially available network software used to connect the system to the network and in part specialized software for moving the FAX messages through the network. In some cases, the FAX message will be stored locally before being forwarded. In others it will be forwarded as received.

Referring to FIG. 7, in another example, each FAX address in table 50 could be associated with an electronic mailbox for a recipient of FAX messages. For example, FAX address A could be associated with a mailbox for Ms. Jones. Any FAX message bearing address A would be routed to Ms. Jones' mailbox and would be accessible to her from, e.g., a PC.

Table 50 can be updated as often as needed to reflect the desired relationships between FAX addresses and corresponding actions.

FAX message mailboxes could be arranged to be accessible in separate deposit only and retrieve only modes. This would allow people who wish to reach a given person to send the FAX message to his mailbox by calling a DID telephone number reserved for incoming messages. The recipient could then retrieve his messages from his mailbox by calling a different DID telephone number reserved for that purpose. Or retrieval could be accomplished using available polling capabilities in a FAX machine which would directly request and receive the stored FAX message, for example under the T.30 protocol, without requiring a touch-tone capability.

Referring to FIG. 8, one possible structure for the FAX software 46 and translator 48 (FIG. 8) would be a modular architecture with three modules: FAXBIOS 80, FAXCALL 82, and FAXMGR 84.

The FAXBIOS would be a low level driver that would interface directly to one or more FAX DID receiver boards 20. Among other things, it would (i) handle interrupts from the board, (ii) send commands to the board, (iii) schedule direct memory accesses (DMAs),(iv) configure the board after a reset command, and (v) include data buffers for each FAX message channel. FAXBIOS would interact with a particular board design in a way that hides the peculiarities of the board design from the software that interacts with the FAXBIOS module.

FAXCALL would handle both incoming and outgoing FAX message calls. FAXCALL would interact with the board through FAXBIOS, e.g., by sending commands (such as a command to dial a telephone number) to FAXBIOS. It would also respond to interrupts that are passed to it via FAXBIOS and would manage the filling and emptying of the data buffers.

For initiating a call, FAXCALL would receive (via a queue in the case of concurrent DOS, or a socket or stream in the case of UNIX) a packet of information identifying the line to call out on, the phone number to call, and a file descriptor for the files to be sent. It then sends the appropriate commands and follows an appropriate procedure to send those files. During the data phase of the call, it would keep the data buffers in the FAXBIOS full with data from the disk until the file is completely sent. It would also report back the status of each page sent and/or errors.

For incoming calls, FAXCALL would store the incoming data into a file and report the status of the call. During the data phase of the call, it would empty the data buffers in the FAXBIOS into a file on a disk. Where the incoming file is stored may depend on routing information received from the board. That routing information could be received immediately in the case of a FAX DID receiver or from some other source later. Storage of the incoming FAX message could occur on are mote drive in a network environment.

The FAXMGR routine would manage a database of calls and files using a commercially available or custom made database manager package (e.g., C-trieve). FAXMGR would serve as a scheduler to send packets for outgoing messages to FAXCALL. For incoming calls, it would contain the table 50 (FIG. 4) and the translator 48 of FIG. 3. FAXMGR would also manage the storage of old FAX message files. The data base would include lists of phone numbers to call and their associated files, and records of what files have been received, and an activity log indicating the status for every page that has been sent or received. A debug mode would record the FSK handshaking sequence performed by a particular FAX port.

In addition specific application programs would allow the creation of the files that will be scheduled by FAXMGR, and utility programs would permit viewing the status of the system for a serial terminal and would provide remote diagnostics.

Figure 9:
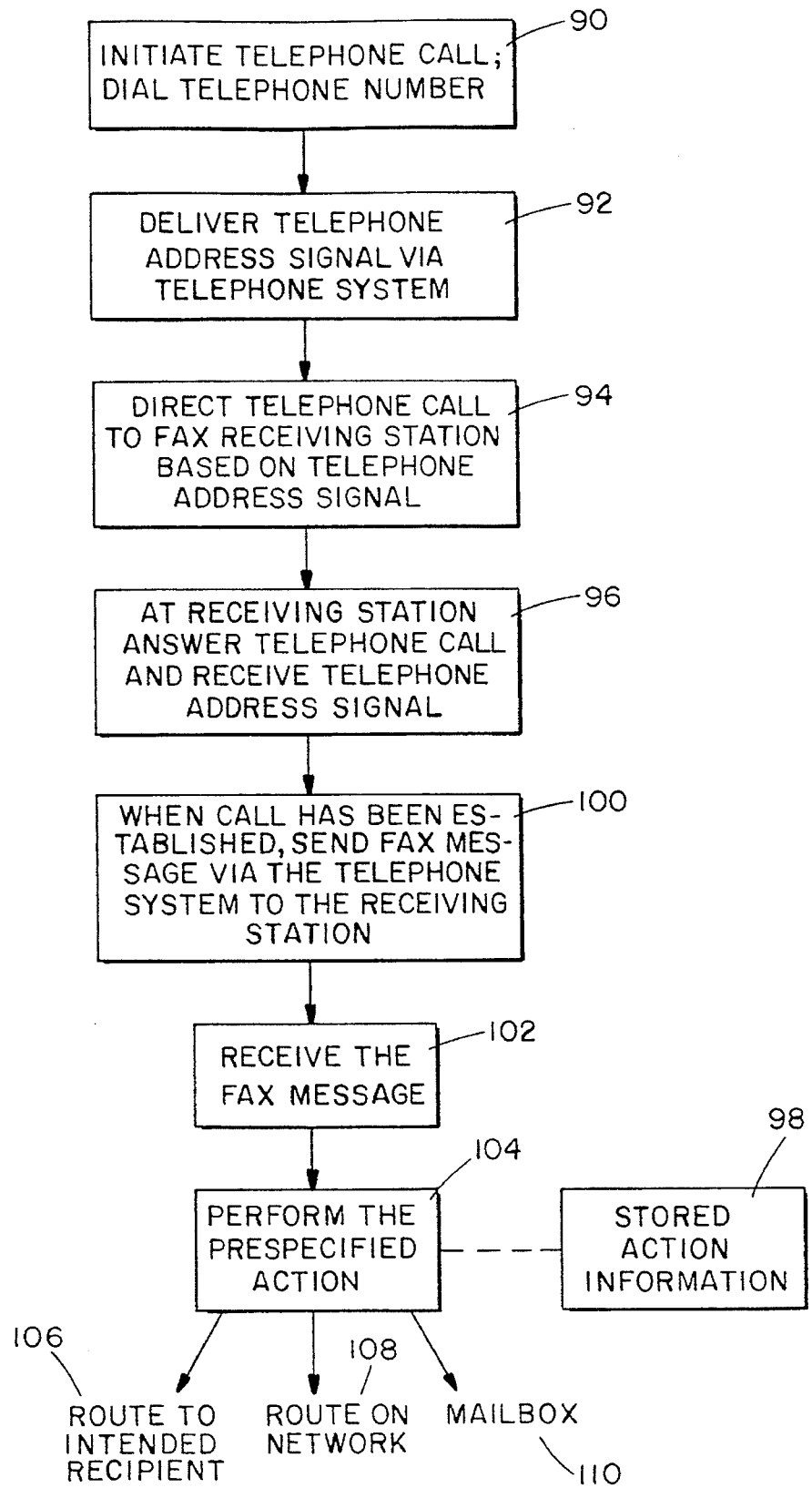
FIG. 9 is a flow chart of the process of sending a FAX message.

Referring to FIG. 9, in operation, a telephone call would be initiated (90) via the telephone system to the FAX receiving station by dialing a telephone number sufficient to route the telephone call to the FAX receiving station, the telephone number also being sufficient to determine the prespecified action to which the FAX message is to be subjected at the receiving end. The telephone number is carried through the telephone system (92) in the form of a telephone address signal as part of the call initiation process. The telephone call being initiated is then directed (94) to the FAX receiving station, based on the telephone address signal. The telephone call is answered (96) at the FAX receiving station and the telephone address signal is received. Stored action information (98) associates each possible telephone address signal with a prespecified action to be taken with respect to each received FAX message corresponding to the telephone address signal. When the call has been established, the FAX message is sent (100) via the telephone system to the FAX receiving station. The sent FAX message is received (102) at the FAX receiving station and handled (104) in accordance with the prespecified action. For example, the action may involve routing the FAX message to an intended recipient (106), routing the FAX message another location in a network of computers to which the FAX receiving station is connected (108), or passing the FAX message to a mailbox (110) associated with an intended recipient.

Other embodiments are within the following claims. Personal computer 18 may have multiple receiver boards 20, each connected to a DID trunk, in order to handle a greater number of simultaneously incoming calls. And other computers 66 in the network may also have receiver boards connected to possibly multiple DID trunks.

Referring to FIG. 6, in another embodiment, the DID trunk can be connected by a telephone line 77 to a separate DID receiver box 70 which sends FAX messages to various personal computers 72, 74, each capable of routing the FAX message to an intended destination, e.g., another device on a network 76, based on address information provided by the DID receiver box. In this case, the DID receiver box 70 would receive the DID address signals, determine which PC the FAX message is intended for, generate ringing signals to be answered by a loop receiver board in the PC, and, after the PC answers, would pass the FAX message directly through to the PC. The DID would also temporarily store the DID address signals, convert them to digits, and pass the digits along to the PC. The PC would then route the FAX message or take action on it in accordance with the digits and based on a table like the table in FIG. 4.

In addition to the routing table provided in the PC 74, the DID receiver box may have its own routing and translation table. One set of DID addresses may translate to ringing of PC 72 while another set of DID address signals cause ringing of PC 74. In addition to selecting the PC 72, 74, the DID table may designate that the DID address be transmitted to the appropriate PC or that any other set of digits, translated from the DID address and identifying the address to which the fax message is to be forwarded, be transmitted. In either case, those digits could be sent as a DTMF signal to PC 74 after that PC answered the ringing from the DID receiver box 70.

In FIG. 6, alternatively a command corresponding to the ring signal and/or the address information could be sent from the DID receiver box to one or more of the PCs over a serial link 79 connected to the serial port of the PC. The FAX message could then be transferred to the PC over the telephone line 77 or serial link 79.

An advantage of the receiving station comprising a separate DID receiver box in combination with the loop receivers on the PCs is that each of the PCs 72, 74 need not have the DID hardware with its additional complexity and power requirements. In typical operation of a DID system initiating a call with the DID receiver box 70, a central office would close a loop circuit drawing current from the DID receiver box. Sensing that loop current, the receiver box 70 would return a ready signal to the central office, and the central office would then send the DID address signal to the box 70. The DID receiver box would only answer the call after establishing the next telephone link. In establishing that link with one of the PCs, the DID receiver box would forward a ringing signal to the appropriate PC which would then answer by closing the loop circuit. The DID receiver box would sense the off hook, closed loop condition of the PC and then forward the appropriate address signals, either the original DID address signals or a translated signal. Thus, the PC fax boards need only be provided with conventional loop receivers which receive power from the line rather than DID receivers which must provide power.

The DID receiver box 70 may take the form of a PBX unit. More sophisticated PBX units have table capabilities and the ability to forward command signals on serial link 79 or DTMF signals on lines 77 after establishing a call. The PBX, and thus the DID receiver, may be an analog system or it may communicate with the central office through digital T1 lines which time multiplex many trunk lines on a single wire.

The FAX receiver 20 of FIG. 1 could be replaced by a stand-alone unit having other capabilities (e.g., modem features) or a normal FAX machine having FAX message storage capabilities, or any device capable of receiving FAX messages, storing them, and acting on address information to route a FAX message to an intended recipient.

Figure 10:
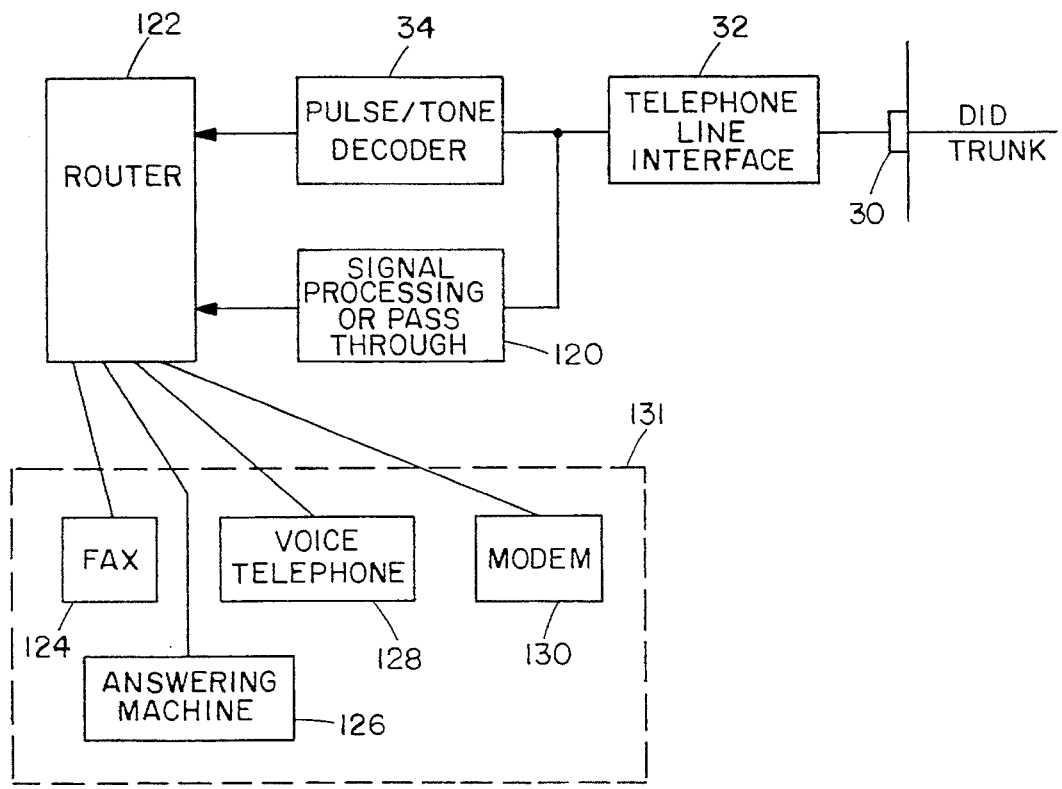
FIGS. 10 and 11 are block diagrams of alternative embodiments.

More generally, referring to FIG. 10, the FAX signal processing unit 36 of FIG. 2 could be replaced by a more general purpose signal processing or passthrough unit 120, capable of processing or passing through any kind of information that can be sent over the DID telephone line, including FAX messages, voice, and modulated data. Unit 120 would be connected to a router 122 (like the personal computer of FIG. 2) which would route the incoming information to a FAX machine 124, answering machine 126, voice telephone 128, or modem 130, as indicated by the telephone address signal carried on the DID line. This facility could be implemented using the telephone company's Simplified Message Desk facility in which case it could also provide outbound service from multiple devices over the same line as well. As indicated by the dashed line box 131, one or more of the FAX, modem, or voice facilities could be served by a single integrated circuit board that could be installed, for example, in a personal computer. The board 131 could also contain the functions performed by router 122. In that arrangement,the incoming telephone address signal, instead of indicating the destination device of the incoming information, could indicate the mode of communication, e.g., voice or FAX or data. Then the router could send a command to cause board 131 to enter the proper mode to respond to and handle the information in the mode in which it is to be received.

Figure 11:
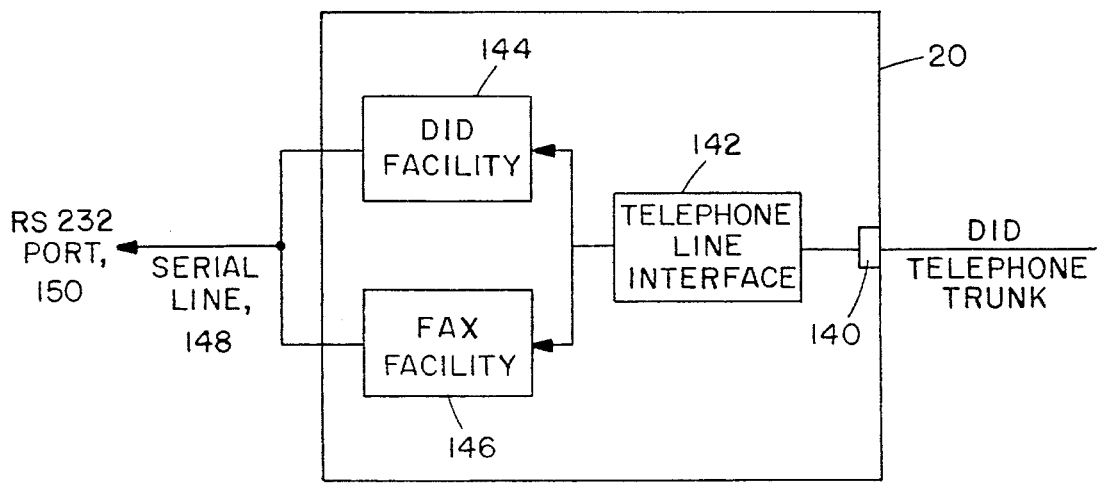

Referring to FIG. 11, FAX DID receiver 20 can be a self-contained stand-alone board or unit which includes a jack 140 for a DID telephone trunk, a telephone line interface, a DID facility 144 capable of detecting DID address signals, a FAX facility 146 for receiving and processing FAX messages and a serial line 148 for delivering DID addresses and FAX messages via an RS 232 port 150 to, e.g., a personal computer.

While this invention has been particularly shown and described with references to preferred embodiments thereof, it will be understood by those skilled in the art that various changes in form and details may be made therein without departing from the spirit and scope of the invention as defined by the appended claims.

For example, the facsimile messages may be used to transmit data files instead of facsimile images. The CCITT Group 3 facsimile protocol is now being extended to permit such data transmissions. Further, a telephone service which provides even more address information than the basic DID service is the DNIS service, and that service may be utilized in the present invention.

What is claimed is:

1. A method for causing information including at least a fax message sent via a telephone system to be routed through a multinode computer network between a telephone receiving station and a prespecified network location, the method comprising:

initiating a telephone call via the telephone system to the receiving station by dialing a telephone number enabling the telephone call to be routed through a telephone network to the receiving station which is coupled to the telephone system and the computer network, said telephone number also being sufficient to indicate a computer network location;

passing said telephone number through the telephone system in the form of a telephone address signal as part of the call initiation process by which a telephone connection to the receiving station is established;

directing the telephone call being initiated to the receiving station, based on the telephone address signal;

answering the telephone call at the receiving station, and receiving at the receiving station at least part of the telephone address signal;

storing computer network location information which associates computer network locations with telephone address signals; and when the connection has been established, sending a fax message between the receiving station and the computer network location based on the telephone address signal.

2. The method of claim 1 wherein the network location is a mailbox associated with an intended recipient.

3. The method of claim 1 wherein the telephone address signal is a direct inward dialing (DID) telephone address signal.

4. The method of claim 3 wherein the receiving station comprises a DID receiver and a second receiver responsive to ringing signals and associated with a computer on the computer network, the DID receiver answering the DID call from the telephone system and initiating a telephone call with a ringing signal to the second receiver 5. The method of claim 4 wherein the DID receiver communicates the routing information to the computer through a data link.

6. The method of claim 1 wherein a fax message is retrieved from the network location.

* * * * *